United States Patent
Beierschmitt

(10) Patent No.: US 10,333,290 B2
(45) Date of Patent: Jun. 25, 2019

(54) MULTI-WINDING GROUND FAULT SENSOR

(71) Applicant: SCHNEIDER ELECTRIC USA, INC., Andover, MA (US)

(72) Inventor: Joseph R Beierschmitt, Marion, IA (US)

(73) Assignee: Schneider Electric USA, Inc., Andover, MA (US)

( * ) Notice: Subject to any disclaimer, the term of this patent is extended or adjusted under 35 U.S.C. 154(b) by 239 days.

(21) Appl. No.: 15/372,740

(22) Filed: Dec. 8, 2016

(65) Prior Publication Data

US 2018/0166874 A1   Jun. 14, 2018

(51) Int. Cl.
*H02H 3/33* (2006.01)
*H02H 1/00* (2006.01)

(52) U.S. Cl.
CPC .......... *H02H 3/331* (2013.01); *H02H 1/0015* (2013.01); *H02H 3/334* (2013.01)

(58) Field of Classification Search
CPC ........... H02H 3/33; H02H 3/331; H02H 3/334
See application file for complete search history.

(56) References Cited

U.S. PATENT DOCUMENTS

| | | | | |
|---|---|---|---|---|
| 4,021,729 A | * | 5/1977 | Hudson, Jr. ............ | G01R 27/18 324/117 R |
| 5,459,630 A | * | 10/1995 | MacKenzie .......... | H02H 1/0015 324/520 |
| 6,266,219 B1 | * | 7/2001 | Macbeth .............. | H02H 1/0015 324/424 |
| 6,538,863 B1 | * | 3/2003 | Macbeth .............. | H02H 1/0015 361/42 |
| 6,876,528 B2 | * | 4/2005 | Macbeth .............. | G01R 15/183 361/42 |
| 7,193,827 B2 | | 3/2007 | Reid et al. | |
| 2006/0158798 A1 | * | 7/2006 | Jackson ................. | H02H 3/334 361/42 |
| 2007/0165342 A1 | * | 7/2007 | Elms ....................... | H02H 3/05 361/42 |
| 2014/0009856 A1 | * | 1/2014 | Ward ..................... | H02H 3/162 361/42 |
| 2017/0146589 A1 | * | 5/2017 | Li ...................... | G01R 31/1272 |

* cited by examiner

*Primary Examiner* — Ronald W Leja
*Assistant Examiner* — Christopher J Clark
(74) *Attorney, Agent, or Firm* — Locke Lord LLP

(57) ABSTRACT

A single current transformer arc fault/ground fault sensing circuit utilizes a sense coil and an injection coil from the line conductor placed concentrically and overlapping on a common core. The injection coil is operated by an in-line switch to allow current flow into the injection winding to influence the sense coil. With both the line and return conductors of a single phase circuit being surrounded by the transformer, opening the switch allows a ground fault sampling period, while closing the switch allows an arc fault sampling period.

6 Claims, 2 Drawing Sheets

MULTI-WINDING GROUND FAULT SENSOR

FIELD OF THE INVENTION

The invention relates to the field of arc fault and ground fault detection, and more particularly, to arc fault and ground fault detection in an electronic miniature circuit breaker.

BACKGROUND

An arc fault circuit interrupter has an arc detection device used to detect hazardous arcing events on a circuit, and in response, to trip a circuit interrupter and remove power to the circuit. These arc fault devices may include circuit breakers such as Combination Arc Fault Circuit Interrupters (for parallel and series arcs) and include Dual Function (Arc Fault (AF) and Ground Fault (GF)) circuit interrupters. Circuit interrupter devices other than circuit breakers might be placed at outlet receptacles or the like.

Traditional arc fault detection requires monitoring load current, thus only the line conductor (i.e. the hot wire of a single pole circuit) is passed through the core of the current transformer. In ground fault sensing, the differential current is monitored and thus both the line and the neutral conductors of the one pole circuit are passed through the core of the current transformer sensor.

For a traditional dual function (arc fault and ground fault) circuit breaker, two current sensors or more are utilized, one sensor being a current transformer for the arc fault detection and a second current transformer being for the ground fault detection. It will be appreciated that component space and overall cost are always limiting factors for circuit interruption devices and especially in the miniature circuit breaker market. The reader is referred to U.S. Pat. No. 6,538,863 to MacBeth for a further overview of these concerns. MacBeth has suggested a so-called "asymmetric winding" for a traditional current transformer involving either a half winding or a tapped winding as a means to achieve arc fault and ground fault functionality with a single current transformer, but leading to a double set of signal chains, one for ground fault and one for arc fault.

SUMMARY

The present invention in one aspect may comprise a single coil-based current sensor with at least two concentric overlapping windings, a switching element, a signal chain, and a processor. By incorporating a switched injection winding fed from the line conductor in addition with a sense winding for the fault detection signal chain, this invention allows for both load current (needed for arc fault) and differential current (needed for ground fault) to be measured and processed using a single sensor. Aspects of the present invention eliminate the need to have two sensors and signal chains when a circuit breaker requires both arc fault and ground fault detection. This allows for a size minimization and component reduction thus allowing for smaller and cost effective implementation of the dual function miniature circuit breaker.

Aspects of the present invention can improve space utilization within the miniature circuit breaker by providing a core which has a plurality of overlapping windings with at least a first "sense winding" and a second "injection winding." The injection winding is connected to the line conductor of the circuit and can be switched in and out of the detection signal chain thus combining the arc fault and ground fault sensors on a single core and thereby keeping one signal chain with accompanying reduction of printed circuit board footprints and a minimum of components in the signal chain to perform during arc fault and ground fault operations, including test operations.

In another aspect the present invention comprises a single transformer arc fault and ground fault sensing circuit for a one pole circuit with line and neutral conductors, having: a) a single current transformer with a core and with a sense winding and an injection winding, each of the sense winding and the injection winding wrapped concentrically in overlapping fashion around substantially all of the core; b) the current transformer surrounding both line and neutral conductors of the one pole circuit; c) the sense winding being connected to current processing circuitry for the detection of ground faults and arc faults in the conductors of the one pole circuit; and the injection winding being connected to the line conductor of the one pole circuit on each side of the transformer, and having an in-line switch on the injection winding on a first side of the transformer; d) whereby: current from the line conductor can be selectively switched into the injection winding thereby inducing flux into the sense winding whereby the current processing circuitry can evaluate the line conductor current for Arc Fault characteristics, and the current from the line conductor can be selectively switched out of the injection winding whereby no flux is induced into the sense winding thus allowing a balance between the conductors to be measured and allowing the current processing circuitry to evaluate the circuit for Ground Fault characteristics, and e) the current processing circuitry further being connected to the in-line switch for the control of the in-line switch on the injection winding.

BRIEF DESCRIPTION OF THE DRAWINGS

The description of the various exemplary embodiments is explained in conjunction with the appended drawings, in which.

DETAILED DESCRIPTION

As an initial matter, it will be appreciated that the development of an actual commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top,"

"bottom," "left," "right," "upper," "lower," "down," "up," "side," and the like, used in the written description are for clarity in specific reference to the drawings and are not intended to limit the scope of the invention.

Further, words of degree, such as "about," "substantially," and the like may be used herein in the sense of "at, or nearly at, when given the manufacturing, design, and material tolerances inherent in the stated circumstances" and are used to prevent the unscrupulous infringer from unfairly taking advantage of the invention disclosure where exact or absolute figures and operational or structural relationships are stated as an aid to understanding the invention.

Figure 1:
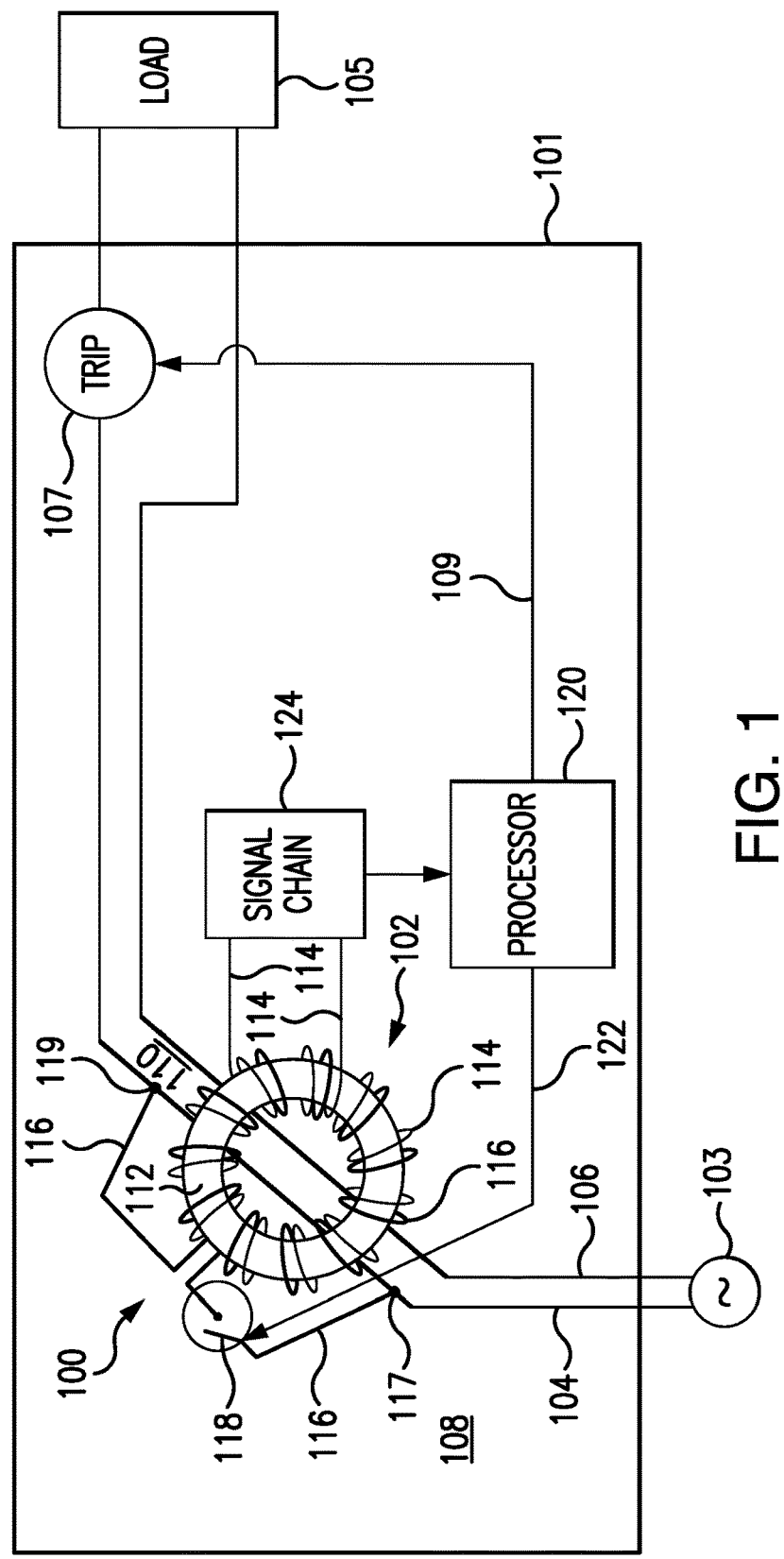
FIG. 1 illustrates a block diagram of some exemplary components of a multi-winding ground fault sensor for AF and GF detection, in a circuit protective device, and especially within a miniature circuit breaker, suitable for use with aspects of the present invention.

FIG. 1 illustrates a dual function electronically circuit breaker 101 as an exemplary circuit protection device with an arc fault/ground fault sensing circuit 100 with a single current transformer 102 through which pass both the line conductor, also sometimes called the hot wire, 104, and neutral conductor, also sometimes called the return wire, 106 of the incoming AC power 103 for a single pole circuit from a first side 108 of the current transformer 102 to a second side 110 of the current transformer 102. The breaker 101, as well understood in the art, functions to control power to a load 105 by separating or "tripping" a set of separable contacts, as at 107, to open the line conductor 104 before reaching the load, by issuing a trip signal over line 109 from the processor 120. Detailed parts and operation of the breaker 101 unnecessary to an understanding of the present invention have been left out for clarity and brevity of the present explanation, but will of course be understood by the person of ordinary skill in the art to be present in a working circuit protection device. Typically the current transformer may be a single Rogowski coil with a permeable core 112 on which is wrapped a first winding 114, called here the "sense winding," and a second winding 116, called here the "injection winding," wrapped to be overlapping the sense winding 112. "Rogowoski coil" refers to a specific type of current transformer, in which the output is actually the derivative (di/dt) of the input. This means that the output varies with frequency, and allows for measuring a small high frequency component in addition to large low frequency components. Most arc fault sensors are of this nature because they are looking at both low and high frequency components. The core is made with permeability much lower than iron to avoid saturation and can be made either as a traditional wound core or it may be incorporated onto a PCB as printed flat coils.

Both coils 116 and 114 are wrapped substantially around the entire core 112 such that the injection winding 116 can induce flux into the core causing a voltage change in the sense winding 114 when current is allowed to flow through the injection winding 116. The injection winding 116 has terminals 117, 119 at the line conductor 104 on the first and second sides 108, 110 respectively, of the current transformer 102. The terminal 117 on the first side 108 has an in-line switch 118 which controls current flow through the injection winding 116. The in-line switch 118 in controlled by a processor 120 (or subroutine thereof) of the sensing circuit 100 as indicated by line 122. The processor further has inputs from the sensing circuit signal chain 124 receiving signal from the sense winding 114 of the current transformer 102. The signal chain may include filters, amplifiers, A/D converters, and the like leading to the processor 120. The signal chain 124 and processor 120 are referred to herein collectively as "the current processing circuitry." The processor 120 will then evaluate for Arc Fault and Ground Fault characteristics to determine if an electrical fault is present at the conductors and issue appropriate instructions such as tripping a movable contact as at 107 within the circuit breaker 101, or other circuit interruption device, if a fault is determined.

When the in-line switch 118 of the injection winding 116 is open, no current flows through the injection winding 116 and thus the sense winding 114 will only see an imbalance between the line conductor 104 and the neutral conductor 106 and thus act as a traditional ground fault sensor. That is, when the line and neutral currents are equal, indicating no standing ground fault, their current effects will cancel and the signal chain will see a net zero effect. When the switch 118 is closed, the line conductor 104 now has two paths, one through the core 112 and a second path through the injection winding 116. The load current will split based upon the different impedances and a small portion of the load current will flow through the injection winding 116. The majority of the current flows on the line conductor 104 through the core 112 thus getting cancelled by the neutral current, however, the portion of current which goes through the injection winding 116 creates an imbalance and thus the signal chain 124 will see a non-zero value. The double wound sensor acts as a standard transformer and thus current from the injection winding 116 is transferred to the sense winding 114, therefore the non-zero value will be proportional to the actual load current. By allowing for overlapped/substantially fully wound coil area, the sensor will provide significantly more output due to higher inductance, and the measurement chain does not need to have as much precision thus allowing lower cost components, when compared to the partial wrapped or asymmetrically tapped arrangement of a single current transformer such as taught in the aforementioned MacBeth reference.

Figure 2:
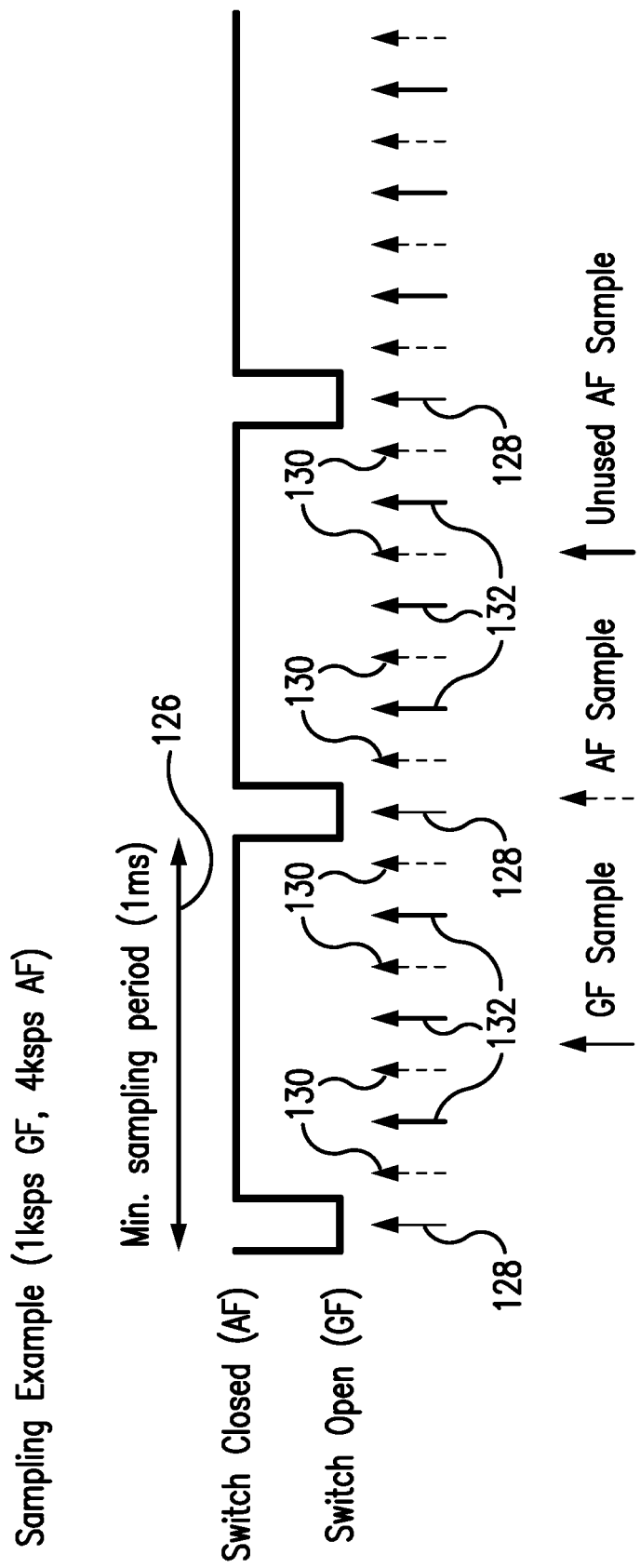
FIG. 2 illustrates a timing diagram for operating the in-line switch of the injection winding in accordance with aspects of the present invention.

FIG. 2 diagrams the timing of the operation of the switch 118 by the processor 120, or subroutine thereof, the exact hardware and/or software implementation being left to the discretion of the designer and considered within the ordinary skill of the art. The switch allows for the current sensor 100 to operate in two modes: ground fault (switch 118 open) and arc fault (switch 118 closed). The switch duty cycle allows for different arc fault and ground fault sampling durations. The switch period 126 can be based upon the minimum sampling requirements of the detection algorithm. For example, if the ground fault algorithm requires 1 kilo-samples per second (ksps) but the arc fault algorithm requires 4 ksps, the following application could be used: a switch period of 1 millisecond (ms), with a switch open duty cycle of ⅛ ms and a switch closed duty cycle of ⅞ ms, and a processor sampling rate of 8 ksps. In the example, every ninth sample, collectively 128, would be used as a ground fault sample, and even numbered samples (second, fourth, sixth, and eighth) collectively 130, would be used as an arc fault sample. Every odd numbered sample in the duty cycle (third, fifth, seventh) collectively 132, can remain unused.

It will be noted that the signal chain of the terminals of the sense winding remains the only signal chain necessary for accomplishing the functionality of the AF/GF detection and thus a spacing saving and reduction of components over a partial wrapped or asymmetrically tapped arrangement of a single current transformer, such as taught in the aforementioned MacBeth reference, is expected.

While particular embodiments and applications of the present disclosure have been illustrated and described, it is to be understood that the present disclosure is not limited to the precise construction and compositions disclosed herein and that various modifications, changes, and variations can be apparent from the foregoing descriptions without departing from the scope of the invention as defined in the appended claims.

The invention claimed is:

1. A single transformer arc fault and ground fault sensing circuit for a circuit with line and neutral conductors, comprising:
    a single current transformer with an opening therethrough and with a sense winding and an injection winding, each of the sense winding and the injection winding wrapped in overlapping fashion around the opening of the current transformer;
    the current transformer surrounding both line and neutral conductors of the circuit;
    the sense winding being connected to current processing circuitry for the detection of ground faults and arc faults in the conductors of the circuit; and
    the injection winding being connected to a line conductor of the circuit on each side of the transformer, and having an in-line switch on the injection winding on a first side of the transformer;
    whereby: current from the line conductor can be selectively switched into the injection winding thereby inducing flux into the sense winding whereby the current processing circuitry can evaluate the line conductor current for Arc Fault characteristics, and the current from the line conductor can be selectively switched out of the injection winding whereby no flux therefrom is induced into the sense winding thus allowing a balance between the conductors to be measured and allowing the current processing circuitry to evaluate the circuit for Ground Fault characteristics, and
    the current processing circuitry further being connected to the in-line switch for the control of the in-line switch on the injection winding.

2. The single transformer arc fault and ground fault sensing circuit according to claim 1 wherein the circuit is a one pole circuit with one line conductor and one neutral conductor.

3. The single transformer arc fault and ground fault sensing circuit according to claim 1 wherein the single current transformer includes a core and each of the sense winding and the injection winding are wrapped in overlapping fashion around substantially all of the core.

4. The single transformer arc fault and ground fault sensing circuit according to claim 1 wherein the current processing circuitry includes a signal chain and a processor.

5. A circuit interrupting device with a single transformer sensor for determining arc fault and ground fault characteristics, comprising:
    the single current transformer with an opening therethrough and with a sense winding and an injection winding, each of the sense winding and the injection winding being wrapped in overlapping fashion around the opening of the current transformer;
    the current transformer surrounding both line and neutral conductors of the circuit;
    the sense winding being connected to current processing circuitry for the detection of ground faults and arc faults in the conductors of the circuit; and
    the injection winding being connected to a line conductor of the circuit on each side of the transformer, and having an in-line switch on the injection winding on a first side of the transformer;
    whereby: current from the line conductor can be selectively switched into the injection winding thereby inducing flux into the sense winding whereby the current processing circuitry can evaluate the line conductor current for Arc Fault characteristics, and the current from the line conductor can be selectively switched out of the injection winding whereby no flux therefrom is induced into the sense winding thus allowing a balance between the conductors to be measured and allowing the current processing circuitry to evaluate the circuit for Ground Fault characteristics, and
    the current processing circuitry further being connected to the in-line switch for the control of the in-line switch on the injection winding; and
    the current processing circuitry further being connected to a circuit interrupting function of the device.

6. The circuit interrupting device of claim 5 wherein the device is a circuit breaker and the current processing circuitry is further connected to a trip function of the circuit breaker to enable a tripping of the circuit breaker upon detection of an arc fault or ground fault occurrence.

* * * * *